March 2, 1971    R. K. HANSEN    3,566,688
GAS VOLUME INDICATOR
Filed March 26, 1969
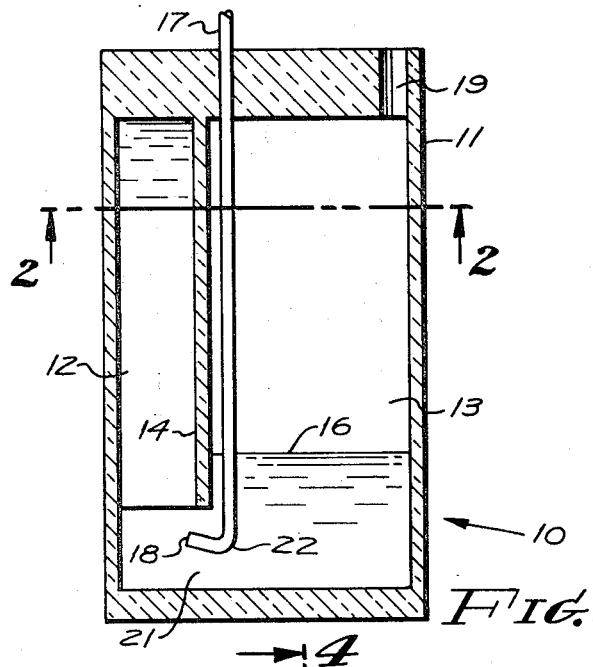
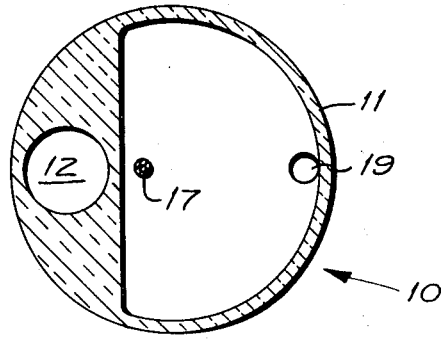
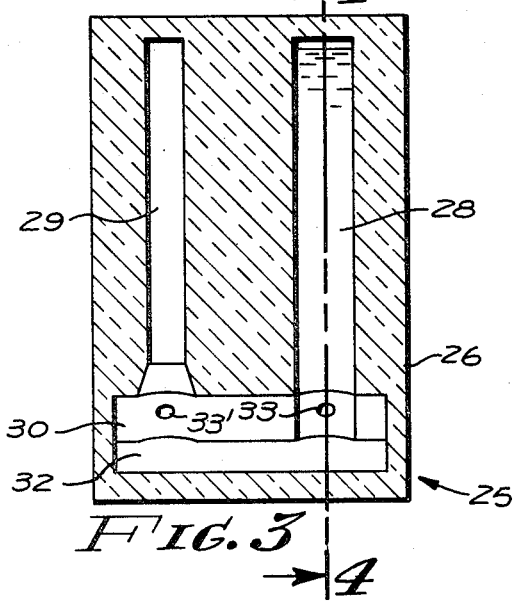
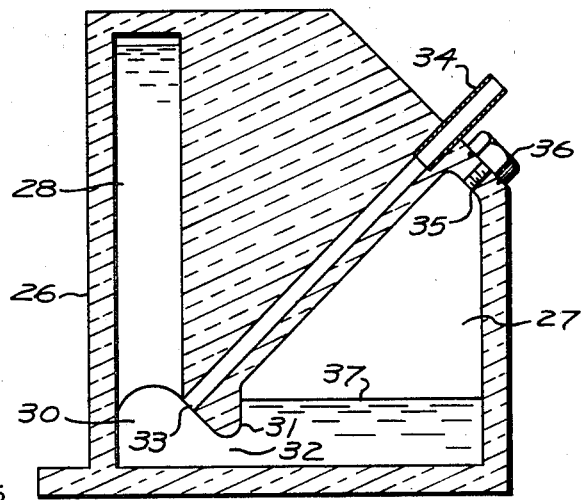
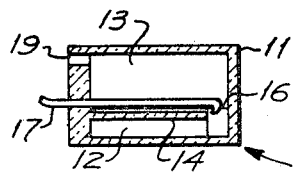
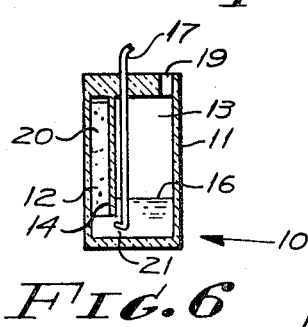
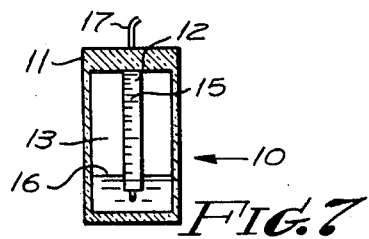
INVENTOR.
RICHARD K. HANSEN
BY Gordon Argus
ATTORNEY.

United States Patent Office 3,566,688
Patented Mar. 2, 1971

3,566,688
GAS VOLUME INDICATOR
Richard K. Hansen, Sacramento, Calif., assignor to
Aerojet-General Corporation, El Monte, Calif.
Filed Mar. 26, 1969, Ser. No. 810,637
Int. Cl. G01n 1/22
U.S. Cl. 73—223                                    10 Claims

ABSTRACT OF THE DISCLOSURE

A gauge according to the present disclosure comprises a housing having a wall defining a displacement chamber and a resorvoir chamber in communication with each other at one end of the displacement chamber so that the displacement chamber can be filled with liquid by resting the gauge on its side. Inlet means for admitting gas is disposed below the displacement chamber. A displacement liquid is disposed within said housing so that gas admitted through the inlet displaces liquid from the displacement chamber, and the volume of gas can be measured. According to an optional feature of this disclosure, the inlet is at approximately the same elevation as the liquid level in the reservoir when the displacement chamber is filled so that virtually no pressure head is created above the inlet due to the liquid in the reservoir.

---

This invention relates to displacement gauges, and particularly to gauges for measuring a quantity of gas by liquid displacement.

It is an object of the present invention to provide a gauge for accurately determining a quantity of gas by means of liquid displacement.

It is another object of the present invention to provide a gauge for measuring the quantity of gas leaked from a gas container.

A gauge according to the present invention comprises a housing having a calibrated displacement chamber and a reservoir chamber. An inlet tube in fluid communication with the displacement chamber is provided for admitting gas into the displacement chamber. A calibrating liquid is disposed within the housing and in the displacement chamber so that when gas is admitted through the inlet, the gas displaces the liquid from the displacement chamber and into the reservoir.

According to an optional and desirable feature of the present invention, the housing is provided with a wall between the inlet and the reservoir, and the inlet is disposed at substantially the same elevation at the level of calibrating liquid in the reservoir thereby substantially eliminating a pressure head of liquid above the inlet.

According to another optional and desirable feature, a plurality of graduated displacement chambers are provided, each having different volume. Each displacement chamber is in fluid communication with the inlet so as to provide various ranges of precision for corresponding ranges of displacement volume.

The above and other features of this invention will be more fully understood in the following detailed description and accompanying drawings, in which:

FIG. 1 is a side view elevation, partly in cutaway cross-section, of a displacement gauge in accordance with the presently preferred embodiment of the present invention;

FIG. 2 is a section view taken along line 2—2 in FIG. 1;

FIG. 3 is a section view of a displacement gauge in accordance with a modification of the present invention;

FIG. 4 is a section view taken along line 4—4 in FIG. 3; and

FIGS. 5 through 7 are views illustrating the manner in which the gauge illustrated in FIGS. 1 and 2 is utilized.

Referring to FIGS. 1 and 2 there is illustrated a displacement gauge 10 in accordance with the presently preferred embodiment of the present invention. Gauge 10 comprises housing 11, which may be constructed of suitable translucent glass or hard plastic, defining a calibrated displacement chamber 12 and reservoir 13. Wall 14 separates displacement chamber 12 from reservoir 13 leaving passage 21 between chambers 12 and 13. Preferably, and as illustrated in FIG. 7, displacement chamber 12 is graduated by markings 15 to enable determination of the volume of fluid displaced from displacement chamber 12. Displacement liquid 16, such as water, is disposed within displacement chamber 12 and reservoir 13. Preferably the displacement fluid is limited to contrast with the surroundings.

Tube 17, which forms the inlet to gauge 10, is open at end 18 below displacement chamber 12. Preferably tube 17 extends through reservoir 13 and is hooked or curved at 22 to extend through opening 21. The opposite end of tube 17 is connected to a suitable source of gas, such as a leak detector collar disposed about a storage container of gas (not shown). Preferably, the upper wall of reservoir 13 includes aperture 19 which serves to relieve pressure within reservoir 13.

Referring to FIGS. 5 through 7, the operation of the displacement gauge illustrated in FIGS. 1 and 2 may be readily explained. Initially, the gauge is placed in the position illustrated in FIG. 5 (which is a side view of the gauge) so that liquid 16 completely fills displacement chamber 12. Tube 17 is connected to a leak source, such as by means of a collar (not shown). Any gas carried by tube 17 into the gauge when the gauge is in the position illustrated in FIG. 5 is vented out through vent 19. When displacement chamber 12 is completely filled with liquid, gauge 10 is returned to the position illustrated in FIGS. 6 and 7 (FIG. 6 being a side view and FIG. 7 being a front view of the gauge), and leak measurement begins. The gas introduced into the gauge through tube 17 is permitted to bubble as illustrated at 20 into displacement chamber 12, thereby displacing liquid 16 therefrom. The volume of liquid so displaced may be determined from markings 15 on the displacement chamber 12.

FIGS. 3 and 4 illustrate a modification of displacement gauge according to the present invention. As illustrated in FIGS. 3 and 4 gauge 25 comprises a translucent housing 26 defining a reservoir 27 and a plurality of calibrated displacement chambers 28 and 29. Chamber 30 is in fluid communication with the lowermost portion of displacement chambers 28 and 29, and is separated from reservoir 27 by means of wall 31. Opening 32 is disposed below wall 31 and above the lowermost portion of housing 26. Inlet 33 is in fluid communication with chamber 30 and with inlet tube 34. As illustrated in the drawings, inlet 33 is disposed beneath displacement chamber 28. It is to be understood, however, that additional gas tube inlets 33' may be disposed beneath the other displacement chambers, such as below chamber 29. Threaded aperture 35 is disposed in the uppermost portion of housing 26 in reservoir chamber 27 to relieve pressure within the reservoir. Preferably, aperture 35 is threaded to receive bleed plug 36 which may be threaded into the aperture to prevent spillage of liquid 37 from reservoir 27 during movement of housing 26.

As illustrated in the drawings, surface level of liquid 37 within reservoir 27 is approximately the same elevation as inlet 33 to chamber 30. Also, displacement chambers 28 and 29 preferably have different calibrated volumes. By way of example, chamber 28 may be a 25 cc. chamber while chamber 29 may be a 5 cc. chamber.

In the operation of the displacement gauge illustrated in FIGS. 3 and 4, displacement chambers 28 and 29 are initially filled with liquid, which can be done by initially resting the gauge on its side in the manner of FIG. 5, before resting it on its base as shown in FIGS. 3 and 4. The amount of liquid placed in the gauge will be such that when all the displacement chambers are thus filled, the liquid level 37 in the reservoir will be substantially that of inlets 33 and 33'. Gas is admitted through one or more of inlets 33, 33' from respective gas inlet tubes. Since the level of the liquid within reservoir 27 is approximately the same as the inlet for the gas, there is substantially no pressure head on the gas by virtue of liquid within the reservoir. Furthermore, since the volume of the reservoir is preferably large compared to the total volume of the displacement chambers, the rise of liquid level within reservoir 27 by virtue of displacement as liquid from the displacement chambers is minimal.

The present invention thus provides an effective gauge for determining a measurement of the quantity of gas. The gauge is particularly effective in use with a leak detector for determining the volume of gas which had leaked from a container. The gauge may be provided with several different gauge volumes so that leak quantities may be accurately measured for various volumes.

This invention is not to be limited by the embodiments shown in the drawings and described in the description, which are given by way of example and not of limitation, but only in accordance with the scope of the appended claims.

What is claimed is:

1. A liquid displacement gauge for measuring a quantity of gas comprising: a reservoir for liquid within a housing having enclosing wall means including a base and a side for the housing such that liquid can be contained within the reservoir when the housing rests either on its base or on its side, means for introducting liquid into said reservoir, a displacement chamber integral with said wall means, closed at one of its ends and opening at its other end to the reservoir, a gas inlet conduit extending into the housing from outside the gauge and having an exit positioned to deliver gas to said chamber, whereby when the vessel is rested on its said side, liquid within the housing fills the chamber, and when the vessel is afterwards rested on its base the liquid remains in the chamber and has a surface in the reservoir outside said chamber at least about up to said opening, whereby gas delivered from the exit while the housing rests on its base rises in the chamber to displace liquid therein.

2. Apparatus according to claim 1 wherein said housing is constructed of a translucent material.

3. Apparatus according to claim 1 wherein said housing defines a plurality of said displacement chambers, and a passage providing fluid communication between the lowermost portion of each displacement chamber, said passage means being defined by said wall opposite said reservoir chamber and above said opening.

4. Apparatus according to claim 3 wherein said inlet means is adapted to admit gas into said passage, and the quantity of displacement liquid in said reservoir is such that the level of liquid in said reservoir is approximately at the same elevation as said inlet means.

5. Apparatus according to claim 4 wherein said inlet means comprises a plurality of apertures in said passage, one of said apertures being disposed below a respective one of said displacement chambers.

6. Apparatus according to claim 5 wherein each of said displacement chambers is adapted to measure a different volume of gas.

7. Apparatus according to claim 6 wherein said housing is constructed of a translucent material.

8. Apparatus according to claim 4 wherein each of said displacement chambers is adapted to measure a different volume of gas.

9. Apparatus according to claim 8 wherein said housing is constructed of a translucent material.

10. Apparatus according to claim 3 wherein said housing is constructed of a translucent material.

References Cited

UNITED STATES PATENTS 523,220   7/1894   Lippert _____ 23—256

JAMES J. GILL, Primary Examiner

M. SMOLLAR, Assistant Examiner

U.S. Cl. X.R.

23—256; 73—421.5